(12) United States Patent
Dutier et al.

(10) Patent No.: US 10,533,627 B2
(45) Date of Patent: Jan. 14, 2020

(54) VIBRATION DAMPING DEVICE FOR MOTOR VEHICLE TRANSMISSION DRIVETRAIN

(71) Applicant: VALEO EMBRAYAGES, Amiens (FR)

(72) Inventors: Ivan Dutier, Rainnevile (FR); Jerome Boulet, Oroer (FR); Herve Maurel, Amiens (FR)

(73) Assignee: Valeo Embrayages, Amiens (FR)

( * ) Notice: Subject to any disclaimer, the term of this patent is extended or adjusted under 35 U.S.C. 154(b) by 269 days.

(21) Appl. No.: 15/546,213

(22) PCT Filed: Jan. 22, 2016

(86) PCT No.: PCT/EP2016/051321
§ 371 (c)(1),
(2) Date: Jul. 25, 2017

(87) PCT Pub. No.: WO2016/120162
PCT Pub. Date: Aug. 4, 2016

(65) Prior Publication Data
US 2017/0363174 A1 Dec. 21, 2017

(30) Foreign Application Priority Data

Jan. 29, 2015 (FR) ...................................... 15 50672

(51) Int. Cl.
*F16F 15/133* (2006.01)
*F16F 15/131* (2006.01)
(Continued)

(52) U.S. Cl.
CPC .......... *F16F 15/1336* (2013.01); *F16F 3/023* (2013.01); *F16F 15/13157* (2013.01); *F16H 57/0006* (2013.01); *F16H 2057/0012* (2013.01)

(58) Field of Classification Search
CPC .. F16F 15/1336; F16F 3/023; F16F 15/13157; F16F 15/1333; F16F 2230/0064; F16H 57/0006; F16H 2057/0012
(Continued)

(56) References Cited

U.S. PATENT DOCUMENTS

| 5,180,334 A * | 1/1993 | Nakane ............... F16F 15/1435 |
| 6,398,655 B1 | 6/2002 | Orlamunder et al. |
| 2015/0369296 A1 | 12/2015 | Lopez-Perez |

FOREIGN PATENT DOCUMENTS

| FR | 2764958 A1 | 12/1998 |
| FR | 3000155 A1 | 6/2014 |
| FR | 3008152 A1 | 1/2015 |

* cited by examiner

*Primary Examiner* — Greg Binda
(74) *Attorney, Agent, or Firm* — Berenato & White, LLC

(57) ABSTRACT

A damping device for damping vibrations of a motor vehicle transmission drivetrain. The damping device features a first element and a second element (2) rotationally movable around a rotation axis X, an elastic damping member having an elastic blade (13, 14) mounted rotationally integrally with the first element (3) and a rolling body movable with respect to the second element along a curvilinear trajectory over at least a predetermined angular sector (A). Movement of the rolling body along the curvilinear trajectory with respect to the second element is accompanied by a movement of the rolling body on the elastic blade, causing the elastic blade to flex.

20 Claims, 3 Drawing Sheets

(51) Int. Cl.
*F16F 3/02* (2006.01)
*F16H 57/00* (2012.01)

(58) Field of Classification Search
USPC .................................................. 464/84, 101
See application file for complete search history.

VIBRATION DAMPING DEVICE FOR MOTOR VEHICLE TRANSMISSION DRIVETRAIN

CROSS-REFERENCE TO RELATED APPLICATIONS AND CLAIM TO PRIORITY

This application is a national stage application of International Application No. PCT/EP2016/051321 filed Jan. 22, 2016, which claims priority to French Patent Application No. 1550672 filed Jan. 29, 2015, the disclosures of which are incorporated herein by reference and to which priority is claimed.

FIELD OF THE INVENTION

The invention relates to the field of devices for damping (in particular, torsional) vibrations, intended to be installed in motor vehicle transmissions.

BACKGROUND OF THE INVENTION

Motor vehicle transmissions are generally equipped with a damping device allowing vibrations to be filtered out upstream from the gearbox, so as to avoid shocks, noise, or acoustic impacts that are particularly undesirable. Damping devices of this kind are installed in particular in dual mass flywheels (DMFs) and/or friction clutches in the case of a manual or automated transmission, or in lock-up clutches that are installed in hydraulic coupling devices, in the case of an automatic transmission.

The damping devices have elastic damping means that rotationally couple a torque input element and torque output element so as to allow transmission of a torque and damping of rotational irregularities.

The document FR3000155 discloses a damping device in which the elastic damping means are constituted by two elastic blades. The two elastic blades are mounted on one of the input and output elements of the damping device, and each interact with an associated roller mounted rotationally movably on the other of the input and output elements. The blades and the rollers are configured in such a way that for an angular deflection between the input element and output element on either side of an inactive relative angular position, the roller moves along the blade and, in so doing, exerts a flexural load on the elastic blade. In reaction, the elastic blade exerts on the roller a return force that tends to bring the input and output elements back to their inactive angular position. The flexing of the elastic blade thus allows damping of the vibrations and rotational inconsistencies between the input element and output element, while ensuring torque transmission.

The performance of a vibration damping device of this kind depends on the angular stiffness of the elastic blades: the lower the angular stiffness of the damping device, the more advantageous its performance. The elastic blades must nevertheless be sufficiently stiff to allow transmission of the maximum torque generated by the engine. In order to allow a decrease in the angular stiffness of a damping device while allowing transmission of the maximum torque generated by the engine, it is thus useful to increase the maximum relative angular deflection between the torque input and output elements. The angular deflection of a damping device as described in the document FR 3000155 remains limited, however, given the constraints associated with the physical size of the blades.

In addition, the torque transmitted between the input element and output element is absorbed by the support shafts of the rollers, which are capable of deforming.

Lastly, the curve for torque transmission as a function of angular deflection is based solely on the profile of the cam surface which is carried by the blade and along which the roller rolls. The shape of the blade is subject to numerous other design constraints, however, such as the physical size and stiffness of the blade, so that certain curves for torque transmission as a function of angular deflection cannot be implemented.

The filtering performance of a damping device as described in the aforementioned document FR3000155 is therefore not entirely satisfactory.

SUMMARY OF THE INVENTION

An idea on which the invention is based is to propose a vibration damping device allowing effective filtering of (in particular, torsional) vibrations.

According to an embodiment, the invention provides a vibration damping device for a motor vehicle transmission drivetrain, comprising:
- a first element and a second element that are rotationally movable around a rotation axis X; and
- elastic damping means coupling the first element and the second element so as to allow torque transmission with damping of (in particular, torsional) vibrations between the first and the second element, said torque transmission with damping being accompanied by a relative rotation between the first element and the second element; said elastic damping means having at least one elastic blade mounted rotationally integrally with the first element;
- the damping device further having a rolling body movable with respect to the second element so that a curvilinear trajectory can be executed on at least a predetermined angular sector (A), the curvilinear movement of the rolling body with respect to the second element being accompanied by a movement of the rolling body on the elastic blade, causing the latter to flex.

The movability of the rolling body with respect to the second element thus allows an increase in the maximum angular deflection between the first and the second element with respect to a damping device of the equivalent existing art in which the roller that interacts with the elastic blade is fastened on one of the input or output elements. A damping device of this kind thus makes it possible to decrease the angular stiffness for a given maximum torque to be transmitted, thus resulting in a significant increase in filtering performance.

Torque is furthermore transmitted between the first element and the second element by means of the rolling body, without passing through a support shaft capable of deforming. Such a configuration thus makes it possible to implement a particularly robust vibration damping device.

In other advantageous embodiments, a damping device of this kind can have one or several of the following characteristics:
- The predetermined angular sector is greater than 20°, in particular greater than 40°, or greater than 60° or 90°.
- The curvilinear trajectory of the rolling body with respect to the second element has a circumferential geometric component.
- A first and a second raceway are carried respectively by the elastic blade and by the second element; and the rolling body is configured to move on the first and the second raceway in order to allow an angular deflection between the first element and the second element; the first and the second raceway being configured in such a way that in a relative angular position between the first element and the second element which differs from an inactive relative position, the rolling body exerts a flexural load on the elastic blade, producing an opposite reaction force of the elastic body on the rolling body, that reaction force having a circumferential component capable of returning said first and second elements to said inactive relative position.

The distances covered by the rolling body on the first raceway and on the second raceway are thus the same, so that the maximum angular deflection between the first and the second element is substantially doubled with respect to a damping device of the equivalent existing art in which the roller, interacting with the elastic blade, would be fastened on one of the input or output elements. A damping device of this kind thus makes it possible to decrease the angular stiffness for a given maximum torque to be transmitted, which results in a significant increase in filtering performance.

In a damping device of this kind the characteristic curve, i.e. the curve representing the change in transmitted torque as a function of angular movement, furthermore depends both on the geometry of the first raceway and on that of the second raceway, while in a blade-type damping device according to the existing art it depends only on the geometry of the cam carried by the blade. A configuration of this kind is thus capable of offering a wider variety of curves for torque transmission as a function of deflection.

According to other advantageous embodiments a damping device of this kind can have one or several of the following characteristics:

The first and the second raceway are carried respectively by the elastic blade and by the second element.

The first and the second raceway are arranged facing one another.

The rolling body is configured to move simultaneously on the first and the second raceway upon a relative rotation between the first element and the second element.

The rolling body is configured to roll on the first and the second raceway upon a relative rotation between the first element and the second element.

The first raceway is situated radially inside the second raceway.

The first and the second raceway are configured in such a way that for a relative angular position between the first element and the second element which is different from an inactive relative position, the rolling body exerts on the elastic blade a flexural load having a radial component, producing an opposite reaction force of the elastic blade having an outwardly directed radial component capable of keeping the rolling body in contact with the first and the second raceway.

The first and the second raceway have profiles configured in such a way that when the transmitted torque increases, the rolling bodies each exert a flexural load on their respective elastic blade, causing the free distal end of the elastic blades to move closer to the axis X and causing a relative rotation between the first and second elements, such that the primary and secondary flywheels move away from their inactive relative position.

The profiles of the raceways are thus such that the rolling bodies exert on their associated elastic blade a flexural load having a radial component and a circumferential component.

The profiles of the raceways are shaped as a function of the damping characteristic curve desired for the damper.

In the inactive relative position, the elastic blade is radially preloaded toward the axis X so as to exert a radially outwardly directed reaction force allowing the rolling body to be kept in contact against the first and the second raceway.

The second element has lateral walls bordering the second raceway and the rolling body, in order to axially retain said rolling body.

The rolling body is a cylindrical roller, each of whose ends is equipped with a protrusion projecting axially along the axis of revolution of the cylindrical roller.

The damper has at least one anti-slip means preventing slippage of the rolling body on the raceways.

The anti-slip means is a coating made of polymer or elastomer, disposed on the rolling surface of the rolling body.

The anti-slip means is a coating made of polymer or elastomer, disposed on at least one of the first and the second raceway.

The anti-slip means is an O-ring or a gasket of rectangular section, received in a groove configured on the rolling surface of the rolling body.

The anti-slip means is a paste or a viscous substance, for example grease, capable of depositing onto the rolling body and/or onto at least one of the first and the second raceway, that paste or viscous substance being incorporated into the interior of the damper.

The anti-slip means is a tooth set configured on at least one of the raceways and on the rolling body.

The first and the second raceway each have a tooth set, and the rolling body is a sprocket having a tooth set meshing with the tooth sets of the first and the second raceway.

The tooth sets of the sprocket and of the first and the second raceway have an involute profile and exhibit a pressure angle of between 20 and 40°.

The tooth sets of the sprocket and of the first and the second raceway are straight teeth.

The tooth sets of the sprocket and of the first and the second raceway are double helical tooth sets.

The elastic blade has a region for fastening onto the first element; and an elastic region having an inner arm, an outer arm, and a bent region connecting the inner arm and the outer arm.

The elastic blade has an elastic region at least a portion of which extends circumferentially around the rotation axis X over an opening angle of at least 20 degrees, in particular at least 45 degrees, preferably at least 60 degrees, for example at least 90 degrees.

In an embodiment, the first raceway is configured on a part applied onto the elastic blade. In another embodiment, the first raceway is configured in the body of the elastic blade.

In an embodiment, the second raceway is configured on a part applied onto the second element. In another embodiment, the second raceway is configured in the body of the second element.

The damping device has limit stops capable of limiting the relative angular deflection between the first element and the second element.

The first and the second raceway are radially facing one another.

The elastic blade has a free distal end capable of moving so that the distance between that end and the rotation axis X varies.

The damping device has:
- a plurality of elastic blades mounted rotationally integrally with the first element;
- a plurality of pairs of raceways each having a first raceway carried by a respective elastic blade and a second raceway carried by the second element; and
- a plurality of rolling bodies each interacting with a respective pair of raceways.

The elastic blades are evenly distributed around the rotation axis X.

The elastic blades are symmetrical with respect to the rotation axis X.

According to an embodiment, the invention relates to a torque transmission system having a damping device recited above.

According to an embodiment, the invention relates to a dual mass flywheel having a primary inertia mass, a secondary inertia mass, and a damping device recited above, the primary inertia mass constituting one of the first and second elements of said damping device, and the second inertia mass constituting the other of said first and second elements.

According to an embodiment, the invention also furnishes a motor vehicle having such a damping device.

BRIEF DESCRIPTION OF THE DRAWINGS

The invention will be better understood, and other objectives, details, characteristics, and advantages thereof will emerge more clearly, in the course of the description below of several specific embodiments of the invention, provided solely for illustrative and non-limiting purposes and referring to the attached drawings.

DETAILED DESCRIPTION OF THE PREFERRED EMBODIMENT(S)

In the description and the claims, the terms "outer" and "inner," as well as the "axial" and "radial" orientations, will be used to designate elements of the vibration damping device in accordance with the definitions given in the description. By convention, the "radial" orientation is directed orthogonally to the rotation axis X of the damping device which determines the "axial" orientation; and, moving away from said axis from inside to outside, the "circumferential" orientation is directed orthogonally to the axis of the damping device and orthogonally to the radial direction. The terms "outer" and "inner" are used to define the relative position of one element with respect to another with reference to the rotation axis X of the damping device; an element close to the axis is thus categorized as "inner" as opposed to an "outer" element situated radially at the periphery. The terms "rear" (AR) and "front" (AV) are also used to define the relative position of one element with respect to another in the axial direction, an element intended to be placed close to the combustion engine being referred to as "rear" and an element intended to be placed close to the gearbox being referred to as "front."

The vibration damping device is intended to be disposed in the transmission drivetrain of a motor vehicle, between the combustion engine and the gearbox. It can be incorporated in particular into a dual mass flywheel, into a clutch mechanism, into a bridge clutch of a hydraulic coupling device, or into a clutch disc.

In the Figures and in the description below, the vibration damping device is integrated into a dual mass flywheel 1. The first element, on which the blades are mounted, is in this case the secondary flywheel, and the second element is in this case the primary flywheel.

Figure 1:
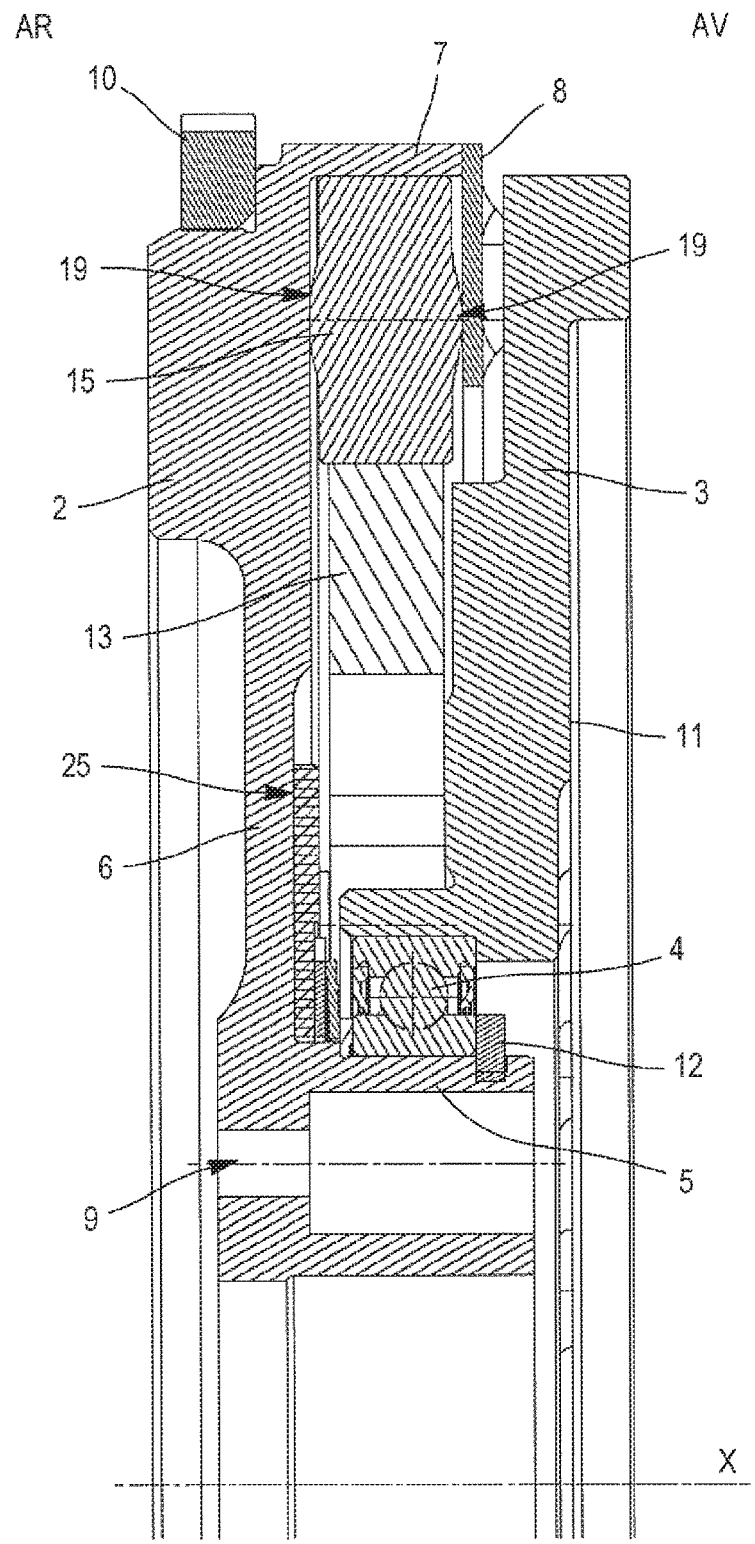
FIG. 1 is a half section view of a dual mass flywheel equipped with a vibration damping device according to a first embodiment.

Referring to FIG. 1, it is evident that dual mass flywheel 1 comprises a primary flywheel 2 intended to be fastened at the end of a crankshaft of an internal combustion engine (not depicted), and a secondary flywheel 3 that is centered and guided on primary flywheel 2 by means of a bearing 4 such as a ball-type rolling bearing. Secondary flywheel 3 is intended to constitute the reaction plate of a clutch (not depicted) connected to the input shaft of a gearbox. Primary flywheel 2 and secondary flywheel 3 are intended to be mounted movably around a rotation axis X, and are furthermore rotationally movable with respect to one another around said axis X.

Primary flywheel 2 has a radially inner hub 5 supporting bearing 4; an annular region 6 extending radially from hub 5; and a cylindrical region 7 extending axially, on the side opposite from the engine, from the outer periphery of annular region 6. Primary flywheel 2 furthermore has an annular cover 8 that is applied against the front end of cylindrical region 7 and defines, with annular region 6 and cylindrical region 7, an annular chamber. Primary flywheel 2 is provided with passthrough orifices 9 for fastening screws intended to fasten primary flywheel 2 onto the crankshaft of the engine. Primary flywheel 2 carries on its external periphery a ring gear 10 for rotational driving of primary flywheel 2 with the aid of a starter.

Hub 5 of primary flywheel 2 has a shoulder that serves for abutment of an inner ring of bearing 4 and retains said inner ring in the direction of the engine. Secondary flywheel 3 similarly has, on its inner periphery, a shoulder that serves for abutment of an outer ring of bearing 4 and retains said outer ring in a direction opposite from the engine. A snap ring 12 of the "circlip" type is mounted in a groove of hub 5 of primary flywheel 2 so as to retain the inner ring of bearing 4 toward the front.

Secondary flywheel 3 has a planar annular surface 11 on the side opposite from primary flywheel 2, constituting an abutment surface for a friction lining of a clutch disc (not depicted). Secondary flywheel 3 has, close to its outer edge, studs and orifices (not depicted) that serve for mounting of a clutch cover.

Figure 3:
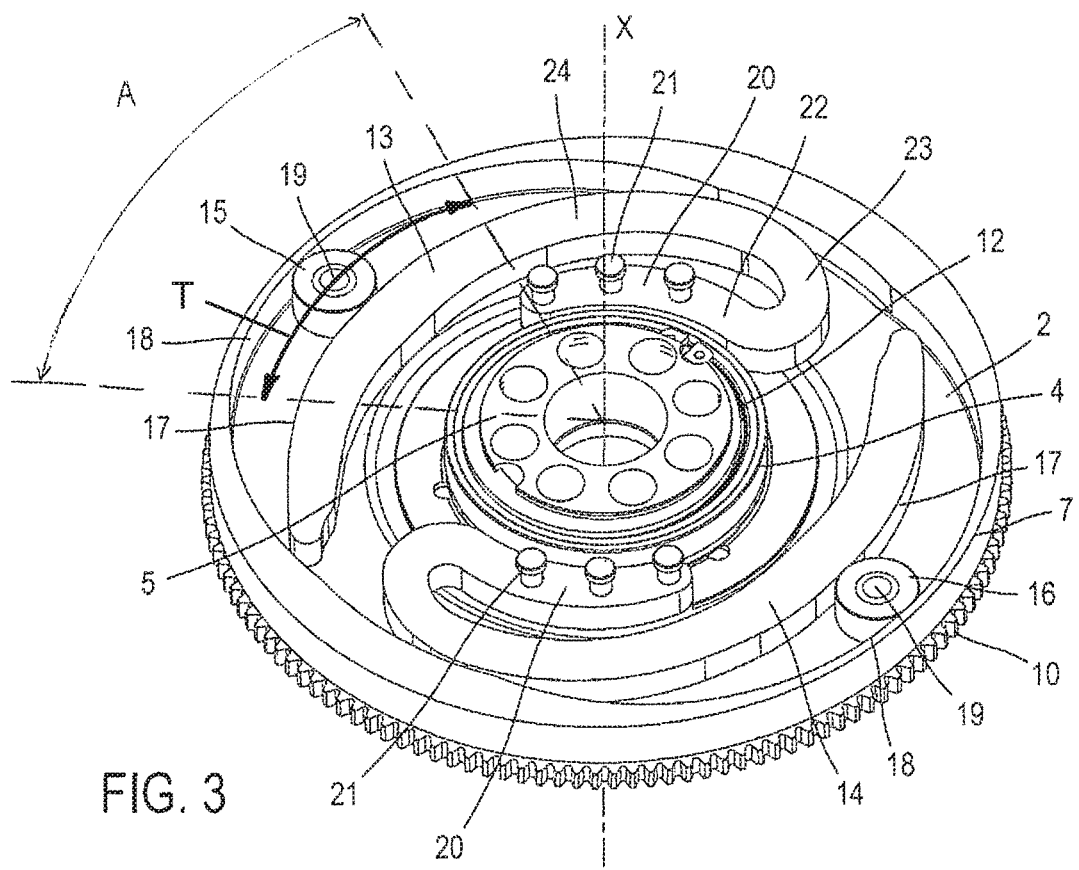
FIG. 3 is a partial perspective view of the dual mass flywheel of FIG. 1, in which neither the secondary flywheel nor the cover of the primary flywheel is depicted.

FIG. 3 depicts the elastic damping means that allow rotational coupling of primary flywheel 2 and secondary flywheel 3. The elastic damping means comprise elastic blades 13, 14, fastened onto secondary flywheel 3, and rolling bodies 15, 16. The rolling bodies 15, 16 are each interposed radially between a first curvilinear raceway 17 carried by one of the elastic blades 13, 14 and a second curvilinear raceway 18 carried by primary flywheel 2. Here each of the rolling bodies 15, 16 is movable with respect to the second element 2 along a curvilinear trajectory T over an angular sector A of approximately 60°.

In an alternative embodiment (not depicted) the structure is reversed, and elastic blades 13, 14 are fastened onto primary flywheel 2 while rolling bodies 15, 16 are interposed radially between a first raceway 17 carried by an elastic blade 13, 14 and a second raceway carried by secondary flywheel 3.

Between elastic blade 13, 14 and the rolling body, the torque transmitted between flywheels 2, 3 breaks down into radial loads and circumferential loads. Reaction forces allow the torque to be transmitted from one flywheel to the other. The radial loads allow the blade to be flexed, and the circumferential loads allow the rolling body to move along raceways 17, 18 and to transmit torque.

When the torque transmitted between primary flywheel 2 and secondary flywheel 3 varies, the radial loads being exerted between elastic blade 17, 18 and rolling body 15, 16 vary, and the flexing of elastic blade 13, 14 is changed. The change in the flexing of the blade is accompanied by a movement of rolling body 15, 16 over the two raceways 17, 18 in response to the circumferential loads.

Each rolling body 15, 16 thus rolls against one and the other of the two associated raceways 17, 18 along the curvilinear trajectory T, and moves in two opposite directions with respect to primary flywheel 2 and secondary flywheel 3. The rolling bodies 15, 16 thus allow a relative deflection between the primary flywheel 2 and the secondary flywheel 3. The curvilinear trajectory T of the rolling body 15 with respect to the primary flywheel 2 has a circumferential geometric component.

Raceways 17, 18 furthermore have profiles configured in such a way that when the transmitted torque increases, rolling bodies 15, 16 each exert a flexural load on their respective elastic blade 13, 14, causing the free distal end of the elastic blades to move closer to axis X, and causing a relative rotation between the first and second elements so that primary flywheel 2 and secondary flywheel 3 move away from their inactive relative position.

The profiles of raceways 17, 18 are therefore such that rolling bodies 15, 16 are moveable with respect to their associated elastic blade 13, 14 along the curvilinear trajectory T so as to exert on their associated elastic blade 13, 14 a flexural load having a radial component and a circumferential component.

The elastic blades exert on rolling bodies 15, 16 a return force having: a circumferential component that tends to cause rolling bodies 15, 16 to rotate in an opposite rotation direction, and consequently to return primary flywheel 2 and second flywheel 3 to their inactive relative position; and a radial component directed outward so as to keep rolling bodies 15, 16 in contact with their respective raceways 17, 18.

According to an embodiment, when primary flywheel 2 and secondary flywheel 3 are in their inactive relative position (illustrated in particular in FIG. 3), elastic blades 13, 14 are preloaded radially toward axis X so as to exert a reaction force, directed radially outward, so as to keep rolling bodies 15, 16 in contact on the one hand with elastic blade 13, 14, and on the other hand with second raceways 18 carried by primary flywheel 2. Such preloading of elastic blades 13, 14 into the inactive relative position ensures relatively precise positioning of rolling bodies 13, 14.

The profiles of raceways 17, 18 can be configured in such a way that the characteristic curve for torque transmission as a function of angular deflection is either symmetrical or not with respect to the inactive position. According to an advantageous embodiment, the angular deflection can be greater in the forward direction than in the reverse direction.

In the embodiment of FIGS. 1 to 4, rolling bodies 15, 16 are cylindrical rollers. The cylindrical rollers can be solid or hollow. It is also possible to use rolling bodies having other shapes, in particular balls, conical rollers, or others. Rolling bodies 15, 16 can be made in particular of bearing steel.

Figure 2:
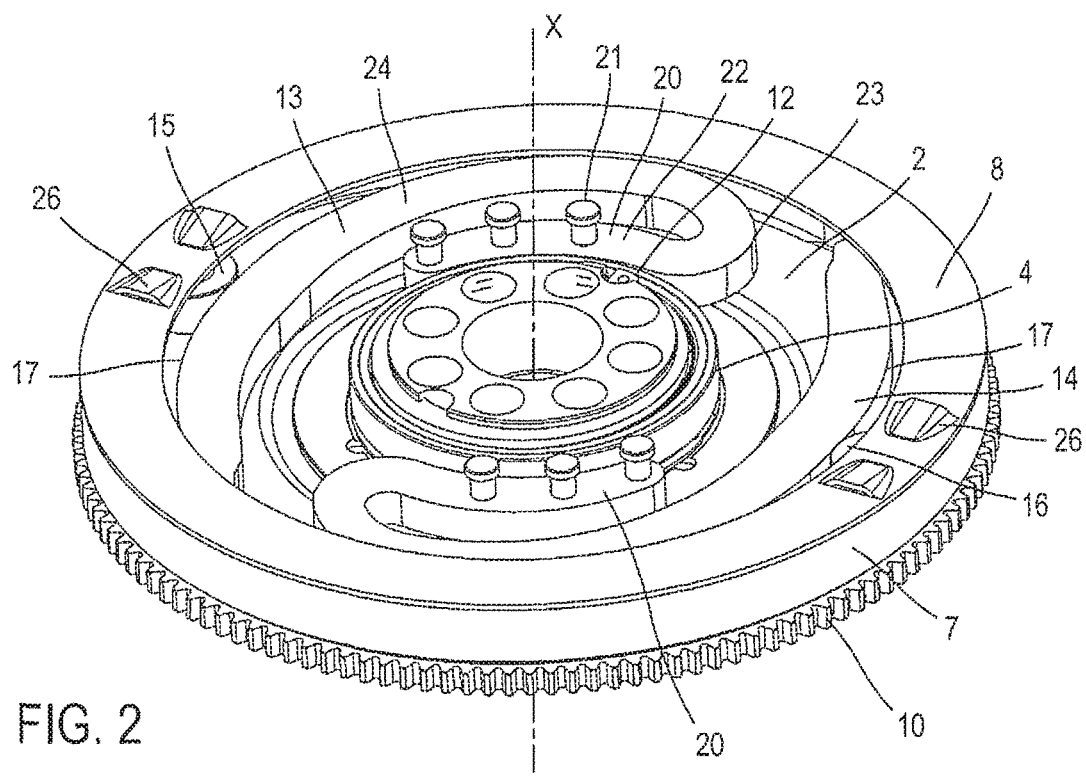
FIG. 2 is a partial perspective view of the dual mass flywheel of FIG. 1, in which the secondary flywheel is not depicted so that the elastic damping means can be visualized.

As depicted in FIGS. 1 and 2, rolling bodies 15, 16 are disposed in the annular chamber defined between cover 8 and annular region 6 of primary flywheel 2. Rolling bodies 15, 16 are thus retained axially by two lateral walls of primary flywheel 2, which are constituted respectively by annular region 6 of primary flywheel 2 and by cover 8 of primary flywheel 2.

In addition, as depicted e.g. in FIGS. 1 and 3, each end of the cylindrical rollers is equipped with a protrusion 19 that projects axially and allows the friction surfaces between primary flywheel 2 and the ends of the cylindrical rollers to be limited.

Second raceways 18 are configured in the internal surface of cylindrical region 7 of primary flywheel 2. Second raceways 18 can be produced by casting or by machining of primary flywheel 2, or can be produced on a part applied onto primary flywheel 2.

Viewed along rotation axis X, second raceways 18 have an arched shape whose concavity is on the side of rotation axis X. Rolling bodies 15, 16 thus move closer to axis X when rolling bodies 15, 16 move apart in one direction or the other with respect to their inactive position illustrated in FIG. 3.

Elastic blades 13, 14 are evenly distributed around axis X and are symmetrical with respect to axis X, in order to ensure that dual mass flywheel 1 is balanced.

Elastic blades 13, 14 are furthermore, for example, made of a spring steel.

Figure 4:
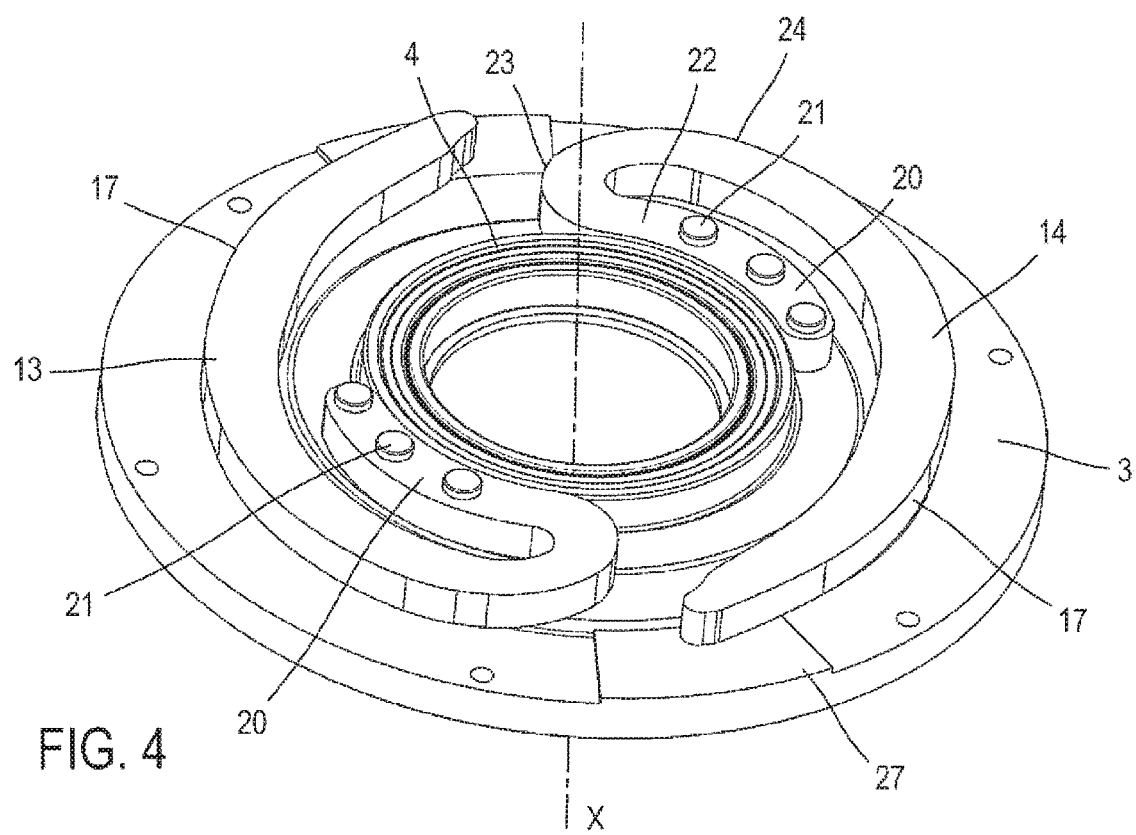
FIG. 4 is a partial perspective view, partly depicting the dual mass flywheel of FIG. 1, in which the primary flywheel is not depicted.

It is evident from FIG. 4 that each elastic blade 15, 16 is fastened independently onto secondary flywheel 3. Each elastic blade 15, 16 has a fastening region 20 fastened onto secondary flywheel 3 by means of a plurality of rivets 21 (three, in the embodiment depicted). Fastening region 21 is prolonged by an elastically deformable region.

The elastically deformable region here comprises an inner arm 22, an outer arm 24, and a bent region 23 connecting inner arm 22 and outer arm 24. Bent region 23 has an angle of approximately 180°, so that a region of inner arm 22 is located radially between a region of outer arm 24 and axis X. In other words, the elastically deformable region has two segments that are radially offset from one another and separated by a radial space.

Inner arm 22 proceeds circumferentially around bearing 4. Outer arm 24 proceeds circumferentially from bent region 23 to a free end of elastic blade 13, 14. Outer arm 24 proceeds circumferentially over an angle of between 120 and 180°.

In addition, first raceways 17 are configured on the external surface of elastic blades 13, 14. Raceways 17 can be produced directly in the body of elastic blades 13, 14, or can be produced on a part that is applied onto elastic blade 13, 14.

Although the invention is described above in conjunction with elastic blades 13, 14 having an inner arm 22 and an outer arm 24 connected by a bent region 23, it is quite apparent that it is in no way limited thereto, and that it will be possible in particular to use elastic blades 13, 14 that have different shapes or are fastened in a different manner. It will also be possible to provide elastic damping means that have only a single elastic blade, or conversely more than two elastic blades.

According to another embodiment (not depicted), it is possible to provide phasing means that allow a constant relative position to be maintained between rolling bodies 15, 16. Such phasing means can be constituted in particular by a cage that allows a constant space to be maintained between rolling bodies 15, 16.

According to an embodiment that is not depicted, the damping device can also have several rolling bodies 15, 16 disposed between each pair of raceways 17, 18. In this case the rolling bodies are kept spaced away from one another by a cage.

Referring again to FIG. 1, it is evident that dual mass flywheel 1 also has a friction assemblage 25 configured to exert a resistive torque between primary flywheel 2 and secondary flywheel 3 upon relative deflection thereof, in order to dissipate the energy accumulated in elastic blades 13, 14. A friction assemblage of this kind typically comprises: a first friction washer capable of being rotationally driven by one of primary flywheel 2 and secondary flywheel 3; a second friction washer capable of being rotationally driven by the other of primary flywheel 2 and secondary flywheel 3; and a spring washer of the "Belleville" type configured to exert a compression load from the first friction washer against the second.

In addition, dual mass flywheel 1 is also equipped with limit stops capable of limiting the relative angular deflection between primary flywheel 2 and secondary flywheel 3. Stops of this kind allow a torque to be transmitted between primary flywheel 2 and secondary flywheel 3 if the damping means are destroyed, and/or allow the damping means to be protected in the event of transmission of an over-torque resulting from extreme utilization conditions or a malfunction of the drive train.

The limit stops comprise on the one hand bosses 26 (depicted in FIG. 2) formed in cover 8 of primary flywheel 2, and on the other hand protrusions 27 (depicted in FIG. 4) formed in the rear surface of secondary flywheel 3. In the embodiment, primary flywheel 2 has two pairs of two bosses 26 disposed diametrically oppositely. Secondary flywheel 3 has two diametrically opposed protrusions 27 that are each disposed circumferentially between the two pairs of two bosses 26.

In the event of a relative rotation of secondary flywheel 3 with respect to primary flywheel 2 which reaches a limit angle with respect to the inactive relative position, protrusions 27 respectively come into abutment against a boss 26 of one and the other of the two pairs of bosses 26.

Figure 5:
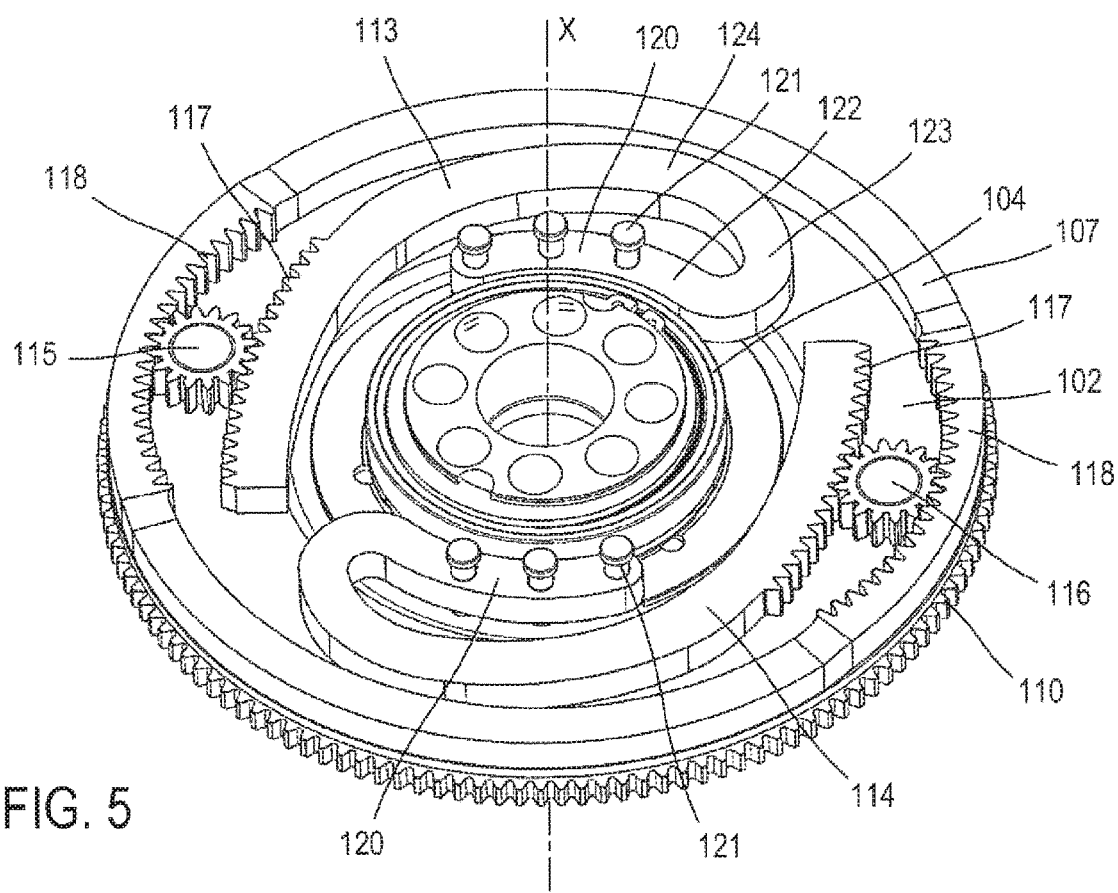
FIG. 5 is a perspective view of a dual mass flywheel equipped with a vibration damping device according to a second embodiment, in which neither the secondary flywheel nor the cover of the primary flywheel is depicted.

FIG. 5 depicts another embodiment of the vibration damping device. Elements analogous or identical to those of the embodiment of FIGS. 1 to 4 are labeled with a reference number incremented by 100.

In this embodiment, the rolling bodies are sprockets 115, 116 or toothed wheels that mesh into tooth sets configured in raceways 117, 118. An embodiment of this kind is advantageous in that it allows sliding motions of sprockets 115, 116 with respect to raceways 117, 118 carried by primary flywheel 2 and elastic blade 113, 114 to be prevented. Precise, symmetrical, and repeatable positioning of rolling bodies 115, 116 is thus ensured. In this embodiment the two rollers can thus be effectively retained in diametrically opposite fashion.

The presence of tooth sets also allows the raceways to be oriented more freely with respect to the roller, since the contacts between the roller and the raceways do not necessarily need to be antagonistic. There are therefore more possible geometries for orienting the raceways.

The tooth sets have an involute profile. According to an embodiment, the pressure angle α of the tooth sets is between 20 and 40°. Particularly strong tooth sets can be achieved with such pressure angles.

In the embodiment depicted, the tooth sets of sprockets 115, 116 and of raceways 117, 118 are straight tooth sets, i.e. made up of teeth whose generating line is a straight line parallel to the rotation axis of the sprocket.

According to another embodiment, the tooth sets of sprockets 115, 116 and of raceways 117, 118 are double helical tooth sets, i.e. made up of two helical tooth sets each having a tooth generating line constituted by a helical line and rotating in opposite directions. Double helical tooth sets are particularly advantageous in that they ensure axial retention of sprockets 115, 116 with respect to raceways 117, 118.

Although the invention has been described in conjunction with several specific embodiments, it is quite apparent that it is in no way limited thereto, and that it encompasses all the technical equivalents of the means described as well as combinations thereof, if they are within the scope of the invention.

Use of the verb "have," "comprise" or "include," and of conjugated forms thereof, does not exclude the presence of elements or steps other than those recited in a claim. Use of the indefinite article "a" or "an" for an element or a step does not, unless otherwise indicated, exclude the presence of a plurality of such elements or steps.

In the claims, no reference character in parentheses shall be interpreted as a limitation of the claim.

The invention claimed is:

1. A damping device for damping torsional vibrations of a motor vehicle transmission drivetrain, the damping device comprising:
    a first element (3) and a second element (2, 102) rotationally movable around a rotation axis X;
    an elastic damping member coupling the first element (3) and the second element (2, 102) so as to allow torque transmission with vibration damping between the first element (3) and the second element (2, 102), the torque transmission with damping being accompanied by relative rotation between the first element (3) and the second element (2, 102); and
    a rolling body moveable with respect to the second element along a curvilinear trajectory over at least a predetermined angular sector (A);
    the elastic damping member including at least one elastic blade (13, 14, 113, 114) mounted rotationally integrally with the first element (3);
    movement of the rolling body along the curvilinear trajectory with respect to the second element being accompanied by a movement of the rolling body on the at least one elastic blade, causing the at least one elastic blade to flex.

2. The damping device according to claim 1, wherein the curvilinear trajectory of the rolling body with respect to the second element has a circumferential geometric component.

3. The damping device according to claim 2, wherein a first raceway (17, 117) and a second raceway (18, 118) are carried respectively by the at least one elastic blade (13, 14, 113, 114) and by the second element (2); wherein the rolling body (15, 16, 115, 116) is configured to move on the first raceway (17, 117) and the second raceway (18, 118) in order to allow an angular deflection between the first element (3) and the second element (2, 102); wherein the first raceway (17, 117) and the second raceway (18, 118) are configured so that in a relative angular position between the first element (3) and the second element (2, 102) which differs from an inactive relative position, the rolling body (15, 16, 115, 116) exerts a flexural load on the at least one elastic blade (13, 14, 113, 114), producing an opposite reaction force of the at least one elastic blade (13, 14, 113, 114) on the rolling body (15, 16, 115, 116), and wherein the opposite reaction force has a circumferential component capable of returning the first and second elements (2, 102, 3) to the inactive relative position.

4. The damping device according to claim 2, wherein the predetermined angular sector is greater than 20°.

5. The damping device according to claim 1, wherein a first raceway (17, 117) and a second raceway (18, 118) are carried respectively by the at least one elastic blade (13, 14, 113, 114) and by the second element (2); wherein the rolling body (15, 16, 115, 116) is configured to move on the first raceway (17, 117) and the second raceway (18, 118) in order to allow an angular deflection between the first element (3) and the second element (2, 102); wherein the first raceway (17, 117) and the second raceway (18, 118) are configured so that in a relative angular position between the first element (3) and the second element (2, 102) which differs from an inactive relative position, the rolling body (15, 16, 115, 116) exerts a flexural load on the at least one elastic blade (13, 14, 113, 114), producing an opposite reaction force of the at least one elastic blade (13, 14, 113, 114) on the rolling body (15, 16, 115, 116), and wherein the opposite reaction force has a circumferential component capable of returning the first and second elements (2, 102, 3) to the inactive relative position.

6. The damping device according to claim 5, wherein the first and second raceways (17, 18, 117, 118) are arranged facing one another.

7. The damping device according to claim 5, wherein the first raceway (17, 117) is situated radially inside the second raceway (18, 118).

8. The damping device according to claim 5, wherein the first and second raceways (17, 18, 117, 118) are configured so that in the relative angular position between the first element (3, 103) and the second element (2) which is different from the inactive relative position, the rolling body (15, 16) exerts on the at least one elastic blade (13, 14, 113, 114) the flexural load having a radial component, producing the opposite reaction force of the at least one elastic blade having an outwardly directed radial component capable of keeping the rolling body (15, 16) in contact with the first and second raceways (17, 18, 117, 118) (17, 18, 117, 118).

9. The damping device according to claim 5, wherein the second element (2) has lateral walls (6, 8) bordering the second raceway (18, 118) and the rolling body (15, 16, 115, 116) in order to axially retain the rolling body.

10. The damping device according to claim 5, wherein the second raceway (18, 118) is configured on a part applied onto the second element (2).

11. The damping device according to claim 5, comprising:
a plurality of elastic blades (13, 14, 113, 114) are mounted rotationally integrally with the first element (3);
a plurality of pairs of raceways each having a first raceway (17, 117) are carried by a respective elastic blade (13, 14, 113, 114) and a second raceway (18, 118) carried by the second element (2, 102); and
a plurality of rolling bodies (15, 16, 115, 116) each interacting with a respective pair of the raceways.

12. The damping device according to claim 5, wherein the predetermined angular sector is greater than 20°.

13. The damping device according to claim 1, wherein the predetermined angular sector is greater than 20°.

14. The damping device according to claim 1, wherein the rolling body (15, 16) is a cylindrical roller, and wherein each of ends of the rolling body is equipped with a protrusion (19) projecting axially along an axis of revolution of the cylindrical roller.

15. The damping device according to claim 1, wherein the at least one elastic blade (13, 14, 113, 114) has a region (20, 120) for fastening onto the first element (3) and an elastic region having an inner arm (22, 122), an outer arm (24, 124) and a bent region (23, 123) connecting the inner arm (22, 122) and the outer arm (24, 124).

16. The damping device according to claim 1, further comprising limit stops (26, 27) configured to limit a relative angular deflection between the first element (3) and the second element (2, 102).

17. The damping device according to claim 1, wherein the predetermined angular sector is greater than 60°.

18. The damping device according to claim 1, wherein the predetermined angular sector is greater than 90°.

19. A damping device for damping torsional vibrations of a motor vehicle transmission drivetrain, the damping device comprising:
a first element (3) and a second element (2, 102) rotationally movable around a rotation axis X;
an elastic damping member coupling the first element (3) and the second element (2, 102) to allow torque transmission with vibration damping between the first element (3) and the second element (2, 102), the torque transmission with damping being accompanied by relative rotation between the first element (3) and the second element (2, 102); and
a rolling body moveable with respect to the second element along a curvilinear trajectory over at least a predetermined angular sector (A);
the elastic damping member including at least one elastic blade (13, 14, 113, 114) mounted rotationally integrally with the first element (3);
movement of the rolling body along the curvilinear trajectory with respect to the second element being accompanied by a movement of the rolling body on the at least one elastic blade, causing the at least one elastic blade to flex;
a first raceway (17, 117) and a second raceway (18, 118) carried respectively by the at least one elastic blade (13, 14, 113, 114) and by the second element (2);
the rolling body (15, 16, 115, 116) configured to move on the first raceway (17, 117) and the second raceway (18, 118) in order to allow angular deflection between the first element (3) and the second element (2, 102);
the first raceway (17, 117) and the second raceway (18, 118) configured so that in a relative angular position between the first element (3) and the second element (2, 102) which differs from an inactive relative position, the rolling body (15, 16, 115, 116) exerts a flexural load on the at least one elastic blade (13, 14, 113, 114), producing an opposite reaction force of the at least one elastic blade (13, 14, 113, 114) on the rolling body (15, 16, 115, 116);
the opposite reaction force having a circumferential component capable of returning the first and second elements (2, 102, 3) to the inactive relative position;

each of the first and second raceways (117, 118) having a tooth set, and the rolling body (115, 116) being a sprocket having a tooth set meshing with the tooth sets of the first and second raceways (117, 118).

20. The damping device according to claim 19, wherein the tooth sets of the sprocket and of the first and second raceways (117, 118) are one of straight teeth and double helical teeth.

* * * * *